(12) United States Patent
Leblanc et al.

(10) Patent No.: US 8,147,916 B2
(45) Date of Patent: Apr. 3, 2012

(54) PROCESS FOR MAKING ELECTRODES FOR LITHIUM BASED ELECTROCHEMICAL CELLS

(75) Inventors: Patrick Leblanc, Boucherville (CA); Frederic Cotton, Montreal (CA); Dave Lessard, Montreal (CA); Alain Vallee, Varennes (CA)

(73) Assignee: Bathium Canada Inc., Boucherville (CA)

( * ) Notice: Subject to any disclaimer, the term of this patent is extended or adjusted under 35 U.S.C. 154(b) by 1000 days.

(21) Appl. No.: 12/044,612

(22) Filed: Mar. 7, 2008

(65) Prior Publication Data

US 2009/0226635 A1 Sep. 10, 2009

(51) Int. Cl.
*B05D 3/02* (2006.01)

(52) U.S. Cl. .......... 427/388.4; 427/557; 427/77

(58) Field of Classification Search .......... 427/388.4, 427/557, 77
See application file for complete search history.

(56) References Cited

U.S. PATENT DOCUMENTS

| | | | |
|---|---|---|---|
| 5,573,672 A * | 11/1996 | Rappas et al. ............ | 210/638 |
| 2003/0170539 A1* | 9/2003 | Schoonmaker et al. ...... | 429/217 |
| 2003/0215710 A1* | 11/2003 | Lavoie et al. ............ | 429/212 |
| 2004/0101752 A1 | 5/2004 | Oosawa et al. | |
| 2004/0115534 A1 | 6/2004 | Park et al. | |
| 2005/0196673 A1 | 9/2005 | Biensan et al. | |
| 2005/0271940 A1* | 12/2005 | Fukunaga et al. ......... | 429/217 |
| 2006/0127767 A1 | 6/2006 | Gauthier et al. | |
| 2006/0166093 A1* | 7/2006 | Zaghib et al. ............ | 429/217 |
| 2006/0211837 A1* | 9/2006 | Ko et al. ................ | 528/35 |

FOREIGN PATENT DOCUMENTS

| | | |
|---|---|---|
| EP | 1548861 A1 | 6/2005 |
| JP | 2006244801 A | 9/2006 |
| JP | 2006294457 A | 10/2006 |
| JP | 2007214027 A | 8/2007 |

OTHER PUBLICATIONS

International Search Report of Application No. PCT/CA2009/000294; Jun. 23, 2009; Kargina, Irina.
English Abstract of Japanese Application No. JP2006244801.
On-Line Machine-Generated English Translation of Japanese Application No. JP2006294457.
English Abstract of Japanese Application No. JP2007214027.

* cited by examiner

*Primary Examiner* — Yogendra Gupta
*Assistant Examiner* — Amjad Abraham
(74) *Attorney, Agent, or Firm* — McMillan LLP

(57) ABSTRACT

A process for making an electrode sheet for a solid lithium electrochemical cells is disclosed. The process comprises the steps of: a) admixing a polyether polymer or copolymer, at least one lithium salt, at least one electrochemically active material and purified water to form an aqueous solution/suspension containing by weight at least 40% purified water, at least 20% active electrode material, up to 10% electrically conductive material, at least 5% polyether polymer or copolymer, and at least 1.5% lithium salt; b) coating the aqueous solution/suspension in the form of an electrode thin film onto an electrode support; and, c) evaporating the water from the electrode thin film to obtain an electrode sheet having less than 1000 ppm of residual water. The evaporation step is preferably carried out through a dryer/oven tunnel having incremental drying zones.

15 Claims, 1 Drawing Sheet

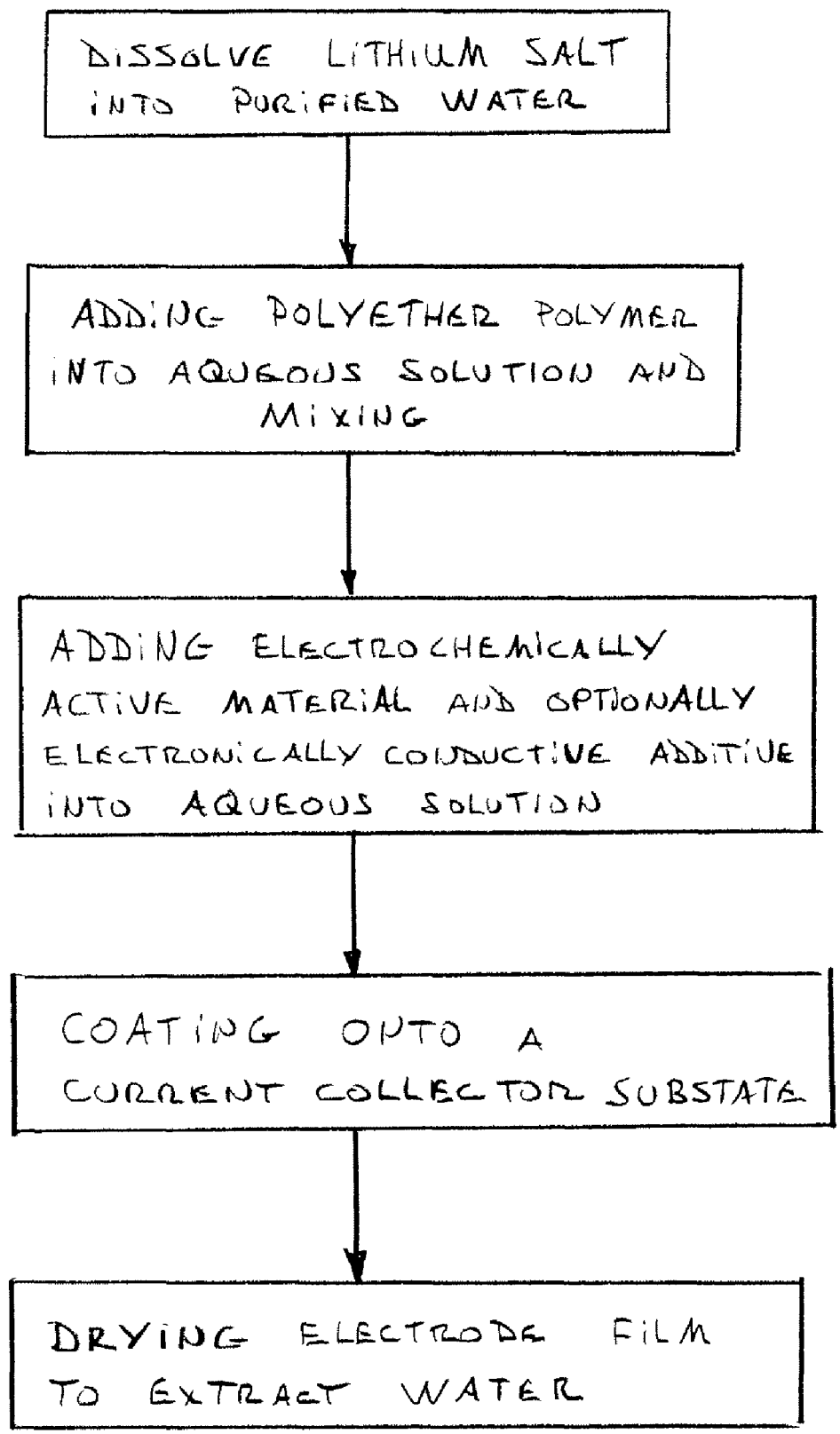

PROCESS FOR MAKING ELECTRODES FOR LITHIUM BASED ELECTROCHEMICAL CELLS

FIELD OF THE INVENTION

The present invention relates to a process for making positive electrodes for lithium based electrochemical cells and more specifically for solid lithium based electrochemical cells.

BACKGROUND OF THE INVENTION

Processes for making thin films of positive electrodes for lithium ion type electrochemical cells typically consist of mixing active electrode material which is usually in powder form with an electrically conductive material such as carbon or graphite particles and a polymer binder into an organic solvent which is then blended into an homogenized electrode slurry. The electrode slurry is thereafter coated on a current collector sheet in the form of a thin layer or film and the organic solvent is removed from the thin film by heating the thin film to evaporate the solvent. The evaporated solvent must be recovered for environmental reasons and the recovery process requires special installations to prevent the solvent in gaseous form from escaping into the environment and specialty equipments for handling and storing the used solvent which must then be disposed of. The resulting dried positive electrode thin sheet is typically porous and contain no electrolyte. The dried positive electrode thin sheet is assembled with a separator and a counterpart negative electrode and the assembly is saturated with a ionically conductive liquid electrolyte comprising a lithium salt dissolved therein to form an lithium ion electrochemical cell. The porous positive electrode is filled with the electrolyte to ensure the ionic exchange between the positive and negative electrodes.

Other coating processes for making thin films of positive electrode material for solid type lithium based electrochemical cells incorporate in the electrode mixture an electrolyte consisting of a polymer and a lithium salt. The mixture comprising an active electrode material, an electrically conductive material, a solvating polymer and a lithium salt is blended in an organic solvent into an homogenized electrode slurry. The electrode slurry is thereafter coated on a current collector sheet in the form of a thin layer or film and the organic solvent is also removed from the thin film by heating the thin film to evaporate the solvent. The positive electrode thin film thereby produced has little porosity since the electrolyte is already in the electrode and fills the space between the active electrode particles. The positive electrode thin film is then assembled with a solid ionically conductive electrolyte separator and a counterpart negative electrode to form a solid lithium based electrochemical cell.

In both cases, organic solvents are used to dilute the electrode mixture sufficiently to lower its viscosity such that the electrode mixture can be spread into thin layers. In both cases, the organic solvent must be removed prior to assembly with the electrolyte separator and the negative electrode to form an electrochemical cell. When producing in large batches or in a continuous process, the organic solvent must be recovered or treated to avoid discharge into the environment in gaseous form.

US patent application US2006/0166093 discloses a process of making positive and/or negative electrode material in which the processing solvent is water. The disclosed process utilizes a so-called water soluble synthetic rubber (SBR) mixed with a thickening agent as the electrode binder. An aqueous solution adapted for spreading is prepared which include an electrochemically active material, a water soluble synthetic rubber, a thickening agent, optionally an electronically conductive material, and water as the solvent. The aqueous solution does not contain lithium salt as the latter is known for its hygroscopic properties which would make it very difficult to dry the electrode after it has been spread into film form in order to remove the water. The film is dried for an extensive period of time (12-24 hours) to reduce the water contain to below 2000 ppm and most preferably 50 ppm. Since no lithium salt is included in the electrode mixture, the electrode film produced is porous in order to allow infiltration of a liquid or gelled electrolyte including a lithium salt to provide an ionically conductive path to the particles of electrochemically active material in the electrode. The process disclosed for making an electrode is therefore a two-step process in which the constituents of the electrode excluding the electrolyte are first mixed in water and dried and when the basic electrode is dried, the electrolyte including lithium salt is added to form a working electrode. The process disclosed is therefore specific to lithium ion type electrochemical cells and is not adapted for production of solid lithium based electrochemical cells which requires that the lithium salt be incorporated in the positive electrode prior to assembly into electrochemical cells.

Thus, there is a need for a method and a process for making electrodes for solid lithium based electrochemical cells which is cost effective and environmentally friendly.

STATEMENT OF THE INVENTION

One aspect of the present invention is to provide a process for making an electrode sheet for a solid lithium electrochemical cells comprising the steps of:
  a) admixing a polyether polymer or copolymer, at least one lithium salt, at least one electrochemically active material and purified water to form an aqueous solution/suspension containing by weight at least 40% purified water, at least 20% active electrode material, up to 10% electrically conductive material, at least 5% polyether polymer or copolymer, and at least 1.5% lithium salt;
  b) coating the aqueous solution/suspension in the form of an electrode thin film onto an electrode support; and,
  c) evaporating the water from the electrode thin film to obtain an electrode sheet having less than 1000 ppm of residual water.

Another aspect of the present invention provides that the lithium salt is first dissolved in the purified water to form an initial aqueous solution. Thereafter, the polyether polymer or copolymer is admixed into the initial aqueous solution to form an interim aqueous solution. Then the active electrode material is admixed into the interim aqueous solution to form a final aqueous solution/suspension.

An additional aspect of the invention provides admixed an electrically conductive material into the interim aqueous solution.

Another aspect of the present invention provides that the water is removed from the electrode thin film by thermal convection, thermal conduction and/or thermal radiation drying process.

A further aspect of the present invention provides that evaporating the water from the electrode thin film is carried out through multiple incremental temperature stages ranging from 100° C. to 160° C.

An additional aspect of the invention provides the electrode thin film travels through a dryer/oven consisting of a tunnel having incremental temperature zones.

A further aspect of the present invention provides that the evaporation of water is carried out under a nitrogen gas sweep at the surface of the electrode thin film.

An additional aspect of the invention provides that the polyether polymer or copolymer is a polyethylene oxide An additional aspect of the invention provides that the polyether polymer or copolymer is cross-linkable.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where:

FIG. 1 is a flowchart illustrating a process method for preparing a thin film positive electrode for use in a solid lithium electrochemical cell in accordance with one embodiment of the present invention.

DESCRIPTION OF PREFERRED EMBODIMENT(S)

All Lithium salts are generally acknowledged as hygroscopic materials having the ability to attract and bind water molecules. Contemplating the use of water as the solvent to mix the constituent elements of an electrode which includes the electrolyte (with a lithium salt) is considered by the electrochemical scientific community as ill advised because of the hygroscopic nature of lithium salts and the difficulties it raises in extracting all traces of water once the electrode has been spread onto a substrate in the form of a thin film considering that small amounts of residual water in the thin film positive electrode will drastically affect the capacity of the electrochemical cell as well as its ability to cycle.

As will be described in details further down, one embodiment of the process involves dissolving a LiTFSI lithium salt into water. LiTFSI, like most salt is generally acknowledged as a hygroscopic material having the ability to attract and hold water molecules. Contemplating the use of water as the solvent to mix the constituent elements of an electrode which includes LiTFSI lithium salt to form a homogeneous paste adapted for spreading raises the difficulty of extracting all traces of water once the electrode has been spread onto a substrate in the form of a thin film considering that small amounts of residual water in the thin film positive electrode will drastically affect the capacity of the electrochemical cell as well as its ability to cycle. Indeed, Lithium salts have a tendency to bind with water molecules and to form hydrated salt molecules. The water molecules are therefore difficult to remove once these hydrated salt molecules are formed and as previously mentioned, even small amounts of water molecules left in the electrode material will drastically affect the overall capacity of the electrochemical cells being manufactured as well as their ability to cycle.

However, the inventors have surprisingly discovered that lithium salts and particularly LiTFSI can be processed, along with the other constituents of an electrode, in distilled or highly purified water and that the water molecules can be extracted from the electrode at the end of the process.

FIG. 1 is a flowchart illustrating a process for preparing a thin film positive electrode in accordance with one embodiment of the present invention. First, a LiTFSI lithium salt $(LiN(CF_3SO_2)_2)$ is dissolved into distilled or at least purified water at a proper ratio for a desired composition. The LiTFSI salt is dissolved in the water using a standard mechanical mixer to ensure complete dissolution of the LiTFSI salt in the water. The amount of water is as much as necessary to dissolve the LiTFSI salt completely. Since the water is evaporated at the end of the process, there is no restriction on the amount of purified water used however, for economical reason related to the efficiency of the drying process, it is better to reduce the amount of water use to the minimum. The amount of purified water used should be enough to dissolve the LiTFSI salt and the polyether polymer added to the solution of water-LiTFSI salt in the second step of the process. Also, the amount of water should be in a range that insures a good rheological behaviour to the aqueous solution/suspension after the addition of the electrochemically active material and the electrically conductive material in order to form a paste that will be readily spread in the form of a thin film. In effect, the ratio by weight of water-LiTFSI salt in the first step of the process should be at least 25:1.

Subsequently, a polyether polymer, preferably a polyethylene oxide polymer or co-polymer is introduced into the aqueous solution including the LiTFSI salt. Polyethylene oxide is one example of a polyether polymer capable of solvating LiTFSI salt such that when water is removed at the end of the process, the polyethylene oxide matrix with the LiTFSI salt dissolved therein serves as the electrolyte component of the electrode. Once dried, the solid electrolyte serves as binder for the materials of the electrode and ensures ionic transport through the electrode. The new interim aqueous solution including the LiTFSI salt and polyethylene oxide is mechanically mixed for 1 hour or until a homogeneous aqueous solution is obtained.

The polyether polymer may be cross-linkable. The use of a cross-linkable polyether polymer enables to utilize a polymer of lower molecular weight, which facilitates the mixing and blending of the electrode components. The polymer matrix may also contain at least one cross-liking additive in order to increase the dimensional stability of the formed electrode. The cross-linking additive is selected from trimethylolpropane, trimethacrylate, polyethylene oxide diacrylate, polyethylene oxide dimethacrylate, glycerol triacrylate, glycerol trimethacrylate, pentaerythiol tetraacrylate, glycerol propoxylate (1PO/OH) triacrylate, dipentaerythiol penta/hexaacrylate and di(trimethylolpropane) tetraacrylate. The matrix may also contain a cross-linking initiator. Cross-linking of the polymer matrix is carried out thermally, by UV radiation or with an electron beam (EB).

An antifoaming agent (silicone based or non-silicone based) may be added to the aqueous solution either before or after the introduction of the polyethylene oxide in order to prevent foam build-up at the surface of the aqueous solution or gas bubbles formation in the bulk of the aqueous solution during mixing. The antifoaming agent is preferably selected from the group consisting of: polydimethylsiloxane, 10% to 100% Silicone Antifoam compound, Acidified Silicone Antifoam, Non-silicone Antifoam Emulsion, Co-Polymer Defoamer, Fatty Alcohol Defoamer, Vegetable Oil-Based Defoamer, 2-ethylhexanol (EH), tributyl phosphate (TBP), and tetrabutylammonium chloride (TBAC).

As an additional or alternative measure to prevent foaming, the mixing process may be carried out under vacuum in order to limit air contact with the aqueous solution during mixing thereby preventing or limiting foam build-up at the surface of the aqueous solution or gas bubbles formation in the bulk of the aqueous solution during mixing.

Thereafter, the electrochemically active material and, if required an electronically conductive additive, is introduced into the aqueous solution including the LiTFSI salt and the polyethylene oxide and the new mixture is mechanically mixed under vacuum for 1 hour or until a homogeneous degassed final aqueous solution/suspension in the form of a slurry is obtained. The electrochemically active material is generally in the form of powders and is preferably selected from LiMPO4 wherein M represents one of a cation selected from the group of Fe, Mn, Co, Ni, and Ti, or combinations of these cations, carbonated $LiFePO_4$ (particles already coated with carbon and/or graphite), $LiFePO_4$, $LiCoO_2$, $LiNiO_2$, $LiMn_2O_4$, and $LiNi_{0.5}Mn_{0.5}O_2$ when preparing a positive electrode, and $Li_4Ti_5O_{12}$ when preparing a negative electrode. All these electrochemically active materials may of course have a nanometric structure.

The electronically conductive additive is typically selected from the group consisting of carbon, carbon black, graphite and cokes. Electronically conductive additive may not be required when the electrochemically active material used in the electrode exhibits electronic surface conductivity. However, even then, electronically conductive additive may be added depending on the end product (electrochemical cell) cycling requirements.

In general terms, the aqueous solution contains by weight at least 40% purified water, at least 20% electrochemically active material, up to 10% electrically conductive material if required, at least 5% polyethylene oxide polymer or copolymer, and at least 1.5% LiTFSI salt. Preferably, the aqueous solution consists of approximately 55% by weight of purified water, 33% by weight of electrochemically active material, 2% by weight of electrically conductive material if required, 8% by weight of polyethylene oxide polymer or copolymer, and 2% by weight of LiTFSI salt.

After about 1 hour of mixing (under vacuum and/or with antifoaming agent added), an homogeneous slurry is obtained which is ready to be formed into a thin film. The homogeneous slurry is preferably spread or coated directly onto a current collector substrate. An aluminium based current collector substrate is typically used for the positive electrode and a copper based current collector substrate is typically used for the negative electrode. The homogeneous slurry is preferably carried out by coating via Doctor blade, reverse roll, gravure roll, curtain, slide die or slot die processes. The slurry may also be heated prior to coating to reduce its viscosity. The coated electrode thin film preferably has a thickness of less than 100 μm and preferably less than 70 μm.

Thereafter, the current collector substrate coated with the electrode slurry is carried through a dryer/oven in order to remove the water from the coated electrode slurry. Preferably, the dryer/oven consists of floatation tunnel including incremental drying zones each consisting moving heated gas set at a specific temperature and velocity through which the electrode thin film travels and exits substantially therefrom. As it travels through the dryer/oven tunnel, the current collector substrate coated with the electrode thin film is suspended in mid air by the moving heated gases such that it is said to float. Water is removed from the electrode thin film by thermal convection, conduction and/or radiation. For example, the dryer/oven tunnel includes five (5) drying zones: In the first three zones, the heated gases are set at a temperature of 130° C. with incremental velocity for each zones, and in the last two zones, the heated gases are set at a temperature of 150° C. with incremental velocity at each zones. In each temperature zones, the velocity of the heated gas is specifically set to remove the maximum amount of water particles left in the electrode thin film without deforming the electrode thin film; each one of these zones removing more and more water until the electrode thin film is dry and substantially all traces of water have been removed such that the electrode thin film contains less than 1000 ppm of water and more preferably less than 600 ppm of water. The temperature and the velocity of the impingement gas of each zone are set to optimise the drying process at a given speed of the film through the dryer/oven tunnel and to insure a good quality of the electrode coating surface. There may be more or less drying zones in the dryer/oven tunnel depending on its length and the temperature steps desired however five (5) incremental drying zones as described in the previous example has resulted in a dry electrode thin film containing less than 1000 ppm of water.

As a further example, each of the five drying zones may have the same heated gas velocity while the temperature of the heated gases increase in steps through each drying zones. The heated gases in the first drying zone being maintained at a temperature of 110° C., then the heated gases in the second drying zone being maintained at a temperature of 120° C., then at a temperature of 130° C. in the third drying zone, then at a temperature of 140° C. in the fourth drying zone and 150° C. in the fifth zone. The dryer/oven tunnel includes multiple temperature zones such that the current collector substrate coated with the thin film of electrode goes through multiple stages of temperature ranging from 100° C. to 160° C. in a continuous process. Each one of these zones removing more and more water until the electrode thin film is dry and substantially all traces of water have been removed.

The length of the dryer/oven tunnel as well as the length of time the current collector and electrode assembly is heated through the various temperature/velocity stages of the dryer/oven tunnel is relative to the speed of the current collector and electrode assembly through the dryer/oven tunnel, the thickness and the initial proportion of water in the electrode slurry. Preferably, the current collector and electrode assembly spends at least one (1) minute in the dryer/oven tunnel with approximately twelve (12) seconds per temperature stage.

In one specific embodiment, the current collector and electrode assembly is pre-heated to a temperature of 90° C. prior to entering the dryer/oven tunnel.

The removal of the water present in the electrode film is also preferably carried out under a nitrogen gas sweep at the surface of the electrode in order to avoid formations of species through reactions of some constituent elements of the electrode with ambient air.

When the polyether polymer (i.e. polyethylene oxide) used in the electrode is cross-linkable and/or contains a cross-linking additive, cross-linking of the polymer matrix occurs through the sequential heat stages of the drying process. The polymer matrix of the electrode is solidified by cross-linking as water is being removed from the electrode.

Various techniques known to one skilled in the art can be used to remove the traces of water that are present in the electrode, after coating of the latter. These traces of water are removed by thermal means on line of the EXT, DBH and/or DB process, or by infra red at a temperature advantageously between 80° C. and 160° C.

Because the electrode produced by the above process contains all the constituent elements of a working electrode and more specifically the ionically conductive electrolyte consisting of the solvating polymer matrix containing the lithium salt, the resulting electrode has less than 10% porosity and preferably less than 5% after being dried and the water of the thin film electrode removed. The resulting electrode is solid yet flexible and is a operational electrode.

Other hygroscopic Lithium salts such as TFSI (LiN($SO_2CF_3$)$_2$), FSI (LiN($SO_2F$)$_2$), BETI (LiN($SO_2CF_2CF_3$)$_2$), LiBOB, $LiBF_4$, and $LiClO_4$ can also be used in the present process using purified water as a solvent instead of LiTFSI and the water may be removed from the electrode by heat or infra-red as outlined above with similar results.

The process described above therefore enables one to produce a working electrode using water as a solvent by mixing all the constituent elements including the ionically conductive electrolyte comprising a Lithium salt prior to assembling the working electrode into an electrochemical cell as opposed to prior art processes in which the basic constituent elements of the electrode, excluding the ionically conductive electrolyte comprising a Lithium salt are mixed, dried and assembled into an electrochemical cell and thereafter, the ionically conductive electrolyte comprising a Lithium salt is introduced in the electrode to complete the formation of a working electrode.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A process for making an electrode sheet for a solid lithium electrochemical cell comprising the steps of:
    a) admixing a polyether polymer or copolymer, at least one lithium salt, at least one electrochemically active material and purified water to form an aqueous solution/suspension containing by weight at least 40% purified water, at least 20% electrochemically active material, up to 10% electrically conductive material, at least 5% polyether polymer or copolymer, and at least 1.5% lithium salt;
    b) coating the aqueous solution/suspension in the form of an electrode thin film onto an electrode support; and,
    c) evaporating the water from the electrode thin film through a dryer/oven consisting of a tunnel having incremental drying zones including heated gases ranging from 100° C. to 160° C. under a nitrogen gas sweep to obtain an electrode sheet having less than 1000 ppm of residual water and less than 10% porosity.

2. A process for making an electrode sheet as defined in claim 1 wherein the at least one lithium salt is selected from the group consisting of LiTFSI, TFSI, FSI, BETI, LiBOB, LiBF4, and LiClO4.

3. A process for making an electrode sheet as defined in claim 1 wherein the electrochemically active material is selected from the group consisting of LiMPO4, carbonated LiFePO4, LiFePO4, LiCoO2, LiNiO2, LiMn2O4, and LiNi0.5Mn0.5O2, and Li4Ti5O12.

4. A process for making an electrode sheet as defined in claim 1 wherein the lithium salt is first dissolved in the purified water to form an initial aqueous solution.

5. A process for making an electrode sheet as defined in claim 4 wherein the polyether polymer or copolymer is admixed into the initial aqueous solution to form an interim aqueous solution.

6. A process for making an electrode sheet as defined in claim 5 wherein the at least one active electrode material is admixed into the interim aqueous solution to form a final aqueous solution/suspension.

7. A process for making an electrode sheet as defined in claim 6 wherein an electrically conductive material is admixed into the interim aqueous solution.

8. A process for making an electrode sheet as defined in claim 1 wherein the water is removed from the electrode thin film by thermal means or by infra red.

9. A process for making an electrode sheet as defined in claim 3 wherein M in the at least one active electrode material of the general formula LiMPO4 represents one of a cation selected from the group of Fe, Mn, Co, Ni, and Ti.

10. A process for making an electrode sheet as defined in claim 3 wherein M in the at least one active electrode material of the general formula LiMPO4 represents a combination of cations selected from the group of Fe, Mn, Co, Ni, and Ti.

11. A process for making an electrode sheet as defined in claim 1 further comprising the step of admixing an antifoaming agent into the aqueous solution.

12. A process for making an electrode sheet as defined in claim 1 wherein the admixing process is carried out under vacuum.

13. A Process for making an electrode sheet as defined in claim 1 wherein the electrode thin film is pre-heated prior to entering the dryer/oven.

14. A process for making an electrode sheet as defined in claim 1 wherein the polyether polymer or copolymer is a polyethylene oxide.

15. A process for making an electrode sheet as defined in claim 1 wherein the polyether polymer or copolymer is cross-linkable.

* * * * *